United States Patent
Bedenk et al.

[15] 3,680,473
[45] Aug. 1, 1972

[54] APPARATUS AND PROCESS OF PUFFING

[72] Inventors: William T. Bedenk, Springfield Township, Hamilton County; Lawrence Grabel, Cincinnati, both of Ohio

[73] Assignee: The Procter & Gamble Company, Cincinnati, Ohio

[22] Filed: Sept. 30, 1970

[21] Appl. No.: 76,771

[52] U.S. Cl. .................................... 99/238.6, 99/81
[51] Int. Cl. ................................................ A23l 1/18
[58] Field of Search...99/238.6, 238 R, 238.1, 238.3, 99/238.4, 238.5, 238.7, 234, 237, 404, 443 C, 81, 153; 259/3; 34/108

[56] References Cited

UNITED STATES PATENTS

| | | | |
|---|---|---|---|
| 1,091,041 | 3/1914 | Cretors | 99/238.6 |
| 1,584,455 | 5/1926 | La Dew | 99/238.6 |
| 1,890,397 | 12/1932 | McCarthy | 34/108 X |
| 2,339,030 | 1/1944 | Purkett | 34/108 X |
| 2,585,293 | 2/1952 | Ashton | 99/404 |
| 2,978,229 | 4/1961 | Jackson | 259/3 |
| 3,086,444 | 4/1963 | De Back | 99/404 X |
| 3,160,395 | 12/1964 | Reising | 259/3 |
| 3,253,533 | 5/1966 | Benson | 99/238.5 |
| 3,606,828 | 9/1971 | Smith | 99/238.6 |

*Primary Examiner*—Robert W. Jenkins
*Assistant Examiner*—Arthur O. Henderson
*Attorney*—Edmund J. Sease and Richard C. Witte

[57] ABSTRACT

Ready-to-eat breakfast cereals are puffed by contact with a bed of heated granular material for a uniform length of time. Unpuffed cereal particles are deposited in an unheated zone and thereafter conveyed through a heated granular material-containing puffing zone whereby the heat from the granular material causes a puffing of the cereal particles. As the cereal particles are being conveyed, the major portion of the granular material is continuously separated therefrom. The remaining portion of granular material is screened out from the puffed flakes during the later phase of the conveying process and is separately conveyed back into the puffing zone. The puffed cereal particles when discharged from the continuous conveying operation are granular material-free and uniformly puffed. The invention also relates to a preferred puffing apparatus.

5 Claims, 3 Drawing Figures

PATENTED AUG 1 1972 3,680,473

INVENTORS
William T. Bedenk
Lawrence Grabel
BY
*Edmund J. Sease*
ATTORNEY

APPARATUS AND PROCESS OF PUFFING

BACKGROUND OF THE INVENTION

During the manufacture of many ready-to-eat cereals a puffing step is utilized to change dense cereal particles into a more porous and light-type cereal product. Basically, a cereal is puffed by causing trapped moisture in the flake to change very rapidly from the liquid state to the vapor phase. Rapid heating or a rapid decrease in pressure are the methods commonly used to convert the dense hard particles into the more palatable porous tender particles. Both methods are well known and are commonly used throughout the industry. Gun puffing is an example of the principle of a rapid decrease in pressure. U.S. Pat. 3,253,533 describes an apparatus and process exemplary of the rapid heating method.

The apparatus used in the process described in the aforementioned patent comprises a rotatable cylindrical shaped container with means for feeding unpuffed cereal particles into one end and collection means at the other end for the puffed cereal. A helical member is attached to the inner shell of the cylinder such that as the cylinder rotates the helical member advances the cereal product from one end to another end. The main portion of the cylinder contains a granular material, e.g., salt which is kept hot by a gas burner and jacket surrounding the cylinder. Unpuffed cereal particles are introduced into one end of a rotating cylinder and are conveyed towards the discharge end by the helical member. As the granular material contacts the cereal particles, a puffing effect occurs. The cylinder is mounted on an angle with the discharge end at the highest elevation and the helical member is perforated so that as the cereal is being puffed and conveyed towards the discharge end the granular heat-transferring material falls by gravity through the perforations to maintain a somewhat stationary bed of material. The remaining granular material that is carried along with the cereal product is separated at a station removed from the puffing cylinder.

The drawbacks encountered with this type of puffing apparatus is that the completely perforated helical member results in a non-uniform time of contact of the heat-transferring material with the cereal particles, and the particular construction of the separating section necessitates the need for additional apparatus to insure the essentially complete separation of granular material and food product. Because of the relatively high temperatures that must be employed to cause a puffing, it is imperative that the exposure time of the cereal particles be short in order to avoid burning or charring of the cereal. On the other hand, too short of a time exposure results in unpuffed or poorly puffed particles and is also to be avoided. To achieve the proper puffing, the cereal particles contact time with a constant temperature granular material must be uniform to achieve a properly puffed batch of cold cereal product. The need for additional separating apparatus is also bothersome and has added to the deficiencies of the apparatus found in the aforementioned patent.

It is an object of this invention to provide improved methods and apparatus for puffing food products that overcome the foregoing deficiencies and which are characterized in achieving a properly puffed food product.

Yet another object of the present invention is to provide a method and apparatus for the puffing of the food products by heat transference from a granular material.

In accordance with an important aspect of the present invention, it is an object to provide a method and apparatus whereby unpuffed food products are contacted with heated granular material for a definite length of time to assure a uniformly puffed product.

It is a further object of this invention to provide a method and apparatus for puffing food products by contact with a heated granular material whereby the food products and granular material are essentially completely separated.

These and other objects will become apparent from the description to follow.

SUMMARY OF THE INVENTION

Briefly stated, this invention relates to process and apparatus useful generally in the food industry and specifically in the cold cereal industry for puffing. A hot bed of a granular material such as salt is maintained in a cylindrical shaped receptacle. Mounted within the receptacle and attached to its surface is a helical member such that as the receptacle rotates the helical member conveys material from the inlet end of the receptacle to the opposite end in an Archimedes screw fashion. The helical member is solid at the inlet end while the remaining portion is perforated in such a manner that the unpuffed food, e.g. cereal particles are conveyed forward while the major portion of the hot granular material falls back through the perforations to maintain an essentially stationary bed of heat transferring material. Granular material that does not pass back through the perforations is screened out at the discharge end of the receptacle and returned internally to the bed of material. Unpuffed cereal particles introduced into the inlet end are passed through the receptacle by the helical member and are contacted for a uniform length of time by the heated granular material for the purpose of puffing the cereal particles.

DESCRIPTION OF THE INVENTION

The apparatus and method of this invention are particularly adapted for use in the food industry. Unpuffed food products are uniformly puffed by contact with a heated granular material for a specific length of time and subsequently separated therefrom. The apparatus and method of this invention are especially suited for converting dense unpuffed ready-to-eat or cold cereal particles into a lighter, more porous puffed form. As used herein the terms cold cereal product and ready-to-eat breakfast cereal are used synonymously.

Figure 1:
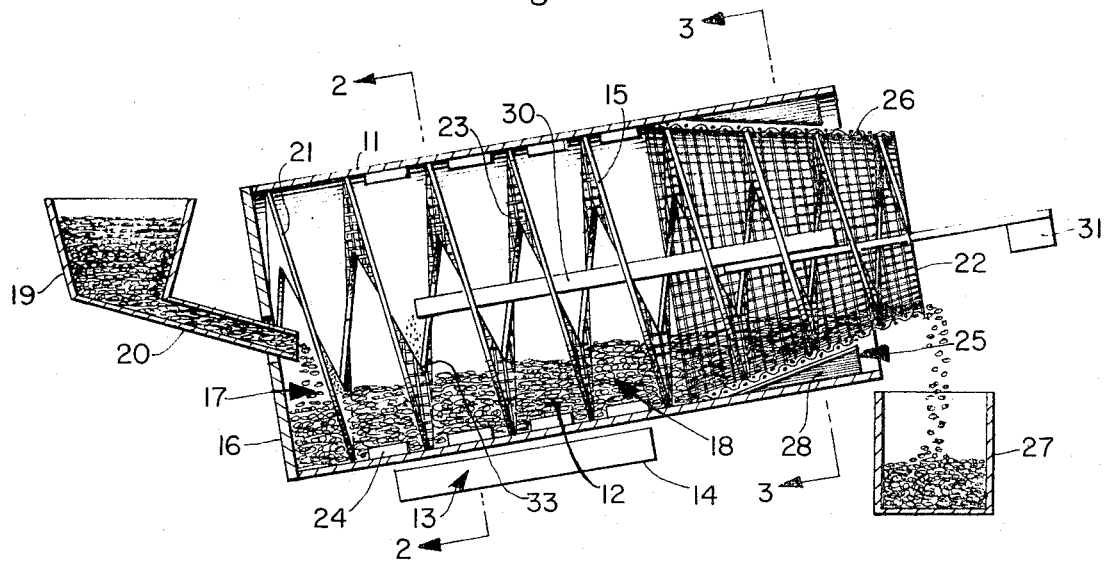
FIG. 1 is a side view partially in cross section of an apparatus for puffing embodying the features of this invention.

Referring first to FIG. 1 there is shown a partial cross section of an apparatus according to the present invention. Drum or receptacle 11 is a cylindrical container mounted for rotation about its longitudinal axis. Receptacle 11 is suitable for containing a heat transferring granular material 12. Preferably the granular material is salt though it can also be sand, steel shot and the like. Closely associated with the outer surface of receptacle 11 is a heat zone 13. Within heat zone 13 a gas burner (not depicted in the Drawing) is utilized to heat the granular material to a predetermined temperature depending on the puffing characteristics of the product. A jacket 14 surrounds the gas burner such that the burning gases are directed to the walls of receptacle 11 which, in turn, heat the granular material. The gas burner is controlled by a heat sensing device in a manner to be described hereinafter.

On the inner surface of receptacle 11 a helical member 15 is rigidly attached. This helical member 15 is composed of flights 21 and is solid for at least the first flight while the remaining flights are perforated. As shown in FIG. 1, screen material can constitute the perforated flights. The end wall 16 partially enclosing the end of receptacle 11 and the solid portion of helical member 15 form a deposition zone 17 that acts as a chamber for the continuous introduction of unpuffed cereal particles. The size of the apertures 23 in the perforated portion of helical member 15 is dependent on the amount of salt recycle desired and on the size of the product being puffed. That is, the apertures are of such size that the granular heating material contained in zone 18 will flow through them but the food product being puffed is too large and thus continues to advance uninterrupted towards discharge end 22 of receptacle 11.

The product to be puffed is introduced into receptacle 11 from a hopper 19 through conduit 20. The flow of product is regulated so that a uniform rate of flow of material is maintained. The unpuffed material is introduced into deposition zone 17 bounded on one side by solid flight 21 of helical member 15. The operation of the apparatus is such that as receptacle 11 rotates about its longitudinal axis, unpuffed cereal is advanced by the flights of helical member 15 from the point of introduction, i.e. deposition zone 17, through the heated granular material within puffing zone 18 and then to discharge opening or exit 22 of receptacle 11. That is, helical member 15 acts as a screw conveyor when receptacle 11 is rotating.

By having at least the first flight of helical member 15 solid, the heated granular material is kept out of the unheated deposition zone 17 wherein unpuffed product is initially introduced into the receptacle. This allows a "batch" of product to build up before the rotation of receptacle 11 causes the "batch" to be deposited into granular-containing puffing zone 18 of receptacle 11. Once contacted with the heat-transferring granular material 12, the product is moved uniformly through receptacle 11 until it reaches exit end 22. If the unpuffed product were introduced directly from the hopper into the granular material-containing puffing zone, there would not be a uniform contact time between the two materials. For instance, unpuffed material that is deposited just behind one of the helical flights would be in contact with the granular material longer than the product that was deposited just in front of one of the helical flights. The latter product material would start its motion towards exit end 22 immediately while the former material would remain essentially motionless in the hot granular material until the next flight arrived.

During operation of the apparatus, unpuffed cereal particles are advanced from deposition zone 17 directly to puffing zone 18. Puffing zone 18 constitutes that portion of the apparatus that contains a bed of the heated granular material 12. This material is the medium used for rapidly transferring heat to the unpuffed particles thereby causing a puffing of the cereal particles. The helical member 15 operates to agitate and aid mixture of the product with the heat transferring granular material 12. The rotary motion of receptacle 11 tumbles the granular material and product, thereby causing a thorough and intimate mixing of the two materials. In that the cereal particles are submerged in the granular material, the rotary motion of receptacle 11 actually results in a cascading effect of the two materials as they are being advanced toward discharge end 22 by helical member 15. This cascading causes a tumbling and mixing effect which insures that the heat transferring material 12 and product are intimately contacted for an extended length of time, thus insuring the uniform transference of heat to the product.

In a preferred embodiment of this invention, baffles 24 are permanently mounted on the inner walls of receptacle 11 within puffing zone 18. These baffles serve the purpose of further insuring a good mixing of the food product and granular material by causing an "interruption" in the movement of the materials as they are being conveyed.

The retention time in puffing zone 18 is quite important for it, in part, determines the degree of puff and amount of browning imparted to the product. The retention time is defined as the time during which the granular material is in contact with the product. This time can vary depending on the temperature of granular material 12, the product being puffed, the degree of puffing desired and the moisture content of the product. For example, to puff flakes comprising cooked cereal grains having 6 to 13 percent moisture, a granular material temperature of 315° to 425°F and a retention time of 6 to 20 seconds is employed. Most preferred conditions are moisture contents of 10 to 12 percent, granular material temperatures of 330° to 350°F, and retention times of 6 to 8 seconds.

The retention time can best be controlled by the rate of rotation of receptacle 11. The faster rotational speed resulting in a lesser retention time and vice versa.

As receptacle 11 rotates, the product is advanced towards exit 22, while the bulk of granular material 12 flows back through the perforations to maintain an essentially constant heat transference bed. To aid in this operation receptacle 11 is mounted so that its central axis is at an angle to the horizontal with discharge end 22 being at a higher elevation than deposition zone 17. The angle of receptacle 11 is adjustable so that the angle to the horizontal can vary from about 1° up to 60°. With receptacle 11 so mounted, the materials contained within are advanced in an inclined direction by helical member 15. As such, gravitational force tends to pull the granular material and product from the discharge end while the helical member tends to move the two materials towards the discharge end. Concomitantly apertures 23 allow the granular material to flow by gravitational force back through them while not permitting the larger product particles to so flow. As a result the major portion of the granular material is separated from the product.

The remaining portion of granular material is essentially completely separated out in separating section 25 located adjacent discharge end 22. Here a screen material 26 is rigidly affixed to receptacle 11 in a tapering fashion. The screen section tapers to a point located outside of receptacle 11. The helical member is also tapered to accommodate the tapered screen section. The length of the extension is such that product being discharged can fall freely into a collection vessel 27 without contacting the outer portions of receptacle 11. As the product and granular material are being conveyed the major portion of granular material flows by gravity through apertures 23. The remaining portion of granular material that reaches separating zone 25 falls through screen 26 while the product continues to be advanced to exit 22. As this juncture the product is essentially granular material-free and is collected, further treated if needed, and packaged for delivery to the consumer.

Figure 2:
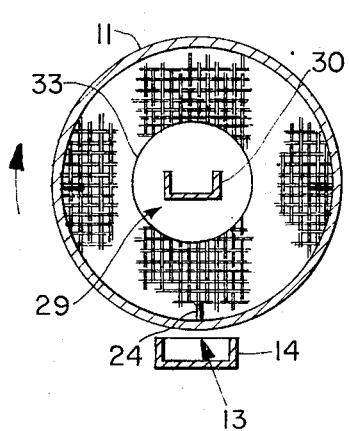
FIG. 2 is a sectional view taken along lines 2—2 of FIG. 1.
Figure 3:
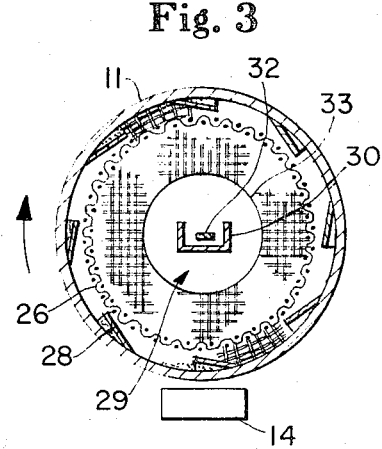
FIG. 3 is a sectional view taken along lines 3—3 of FIG. 1.

As best viewed in FIG. 3 the granular material that falls through screen 26 accumulates on the inner surface of receptacle 11. Lifters 28 permanently attached to receptacle 11 catch the granular material and lift it to the uppermost portion of the rotating receptacle 11. The central portion of helical member 15 is hollow so as to form an open central section 29 bounded by inside surface 33 of the helical flights of member 15 as best represented in FIGS. 2 and 3. Suspended within this central section 29 is a chute 30. Chute 30 is open at the top for the purpose of receiving the granular material. As lifters 28 lift the granular material to uppermost portion of receptacle 11 the granular material is deposited by gravity into chute 30. The granular material is then conveyed back through receptacle 11 in a direction countercurrent to the flow of the product until it reaches a point above the bed of heat transferring granular material 12 where it is deposited by gravity. As shown in FIG. 1, a vibrator 31 is attached to chute 30 for the purpose of aiding in the transference of the separated granular material back along chute 30.

Also attached to chute 30 is a temperature indicating device 32, e.g. a thermometer or a thermocouple. The device 32 located at this point indicates the temperature of granular material 12 returning to the granular bed which in turn can be used to adjust the gas burners in heat zone 13. This adjustment can be either manual or remotely controlled by a signal from temperature indicating device 32.

The speed of rotation of receptacle 11 and helical member 15 is precisely controlled to maintain a uniform time of exposure between the granular material and cereal particles. Since the temperature of heat-transferring granular material 12 is closely regulated by sensing device 32 in conjunction with heat zone 13, the amount of heat transferred to the unpuffed product by contact with the hot granular material 12 is precisely controlled to produce a uniform product puffed to the degree desired.

The optimum amount of granular material kept in receptacle 11 is such that the upper level is slightly below inside surface 33 of helical member 15. If granular material 12 overflows this inside surface 33, the intermixed food product will also overflow thereby destroying the precise contact time of the product and granular material. The apertures 23 and elevation of receptacle 11 can be varied to permit most of the granular material to flow freely by gravity back into the puffing zone and thus keep an essentially stationary heat-transferring bed or allow essentially all of the salt to be recycled. That is, in the latter case, in the absence of the apertures, the granular material would all be moved towards the discharge end and thus be separated from the puffed product by the screen and carried back to the puffing zone by way of lifters 28 and chute 30.

The following example is given as illustrative of the operation of the apparatus of this invention and of the process of puffing a cereal product.

The apparatus of this invention having a 1-foot diameter, 4-foot puffing zone, and 6-foot overall length, is charged with salt in an amount such that the upper level it forms in the puffing zone is slightly below the inside portions of the flights of helical member 15. The salt used has a particle size such that 98 percent of it will pass through a No. 35 mesh screen. After this material is heated to a temperature of approximately 330°F, unpuffed cereal flakes are continuously charged into deposition zone 17. The cereal flakes comprise corn as a major ingredient and have a moisture content of 10 percent. As the receptacle 11 rotates at 30 rpm, the cereal flakes accumulated in the deposition zone 17 are conveyed to the salt-containing or puffing zone 18 where they undergo puffing. The residence time of the cereal flakes in this puffing zone, as controlled by the speed of rotation of the receptacle, is about 8 seconds. By the time the cereal flakes reach the separation section of the apparatus, they are fully puffed and have been separated from the major portion of the salt, i.e. the major portion of the salt has fallen back through the apertured screw conveyor. The remaining salt falls through the screen portion of the separating section, is lifted, deposited in chute 30, and conveyed back to the puffing zone. The flakes collected as they are discharged from the apparatus are uniformly puffed and toasted, i.e., they are all properly puffed to the degree desired with no burnt flakes present.

What is claimed is:

1. A continuous puffing apparatus comprising an inclined rotary puffing receptacle suitable for containing a granular heat transfer material and having a discharge end and a partially enclosed end opposite the discharge end, heat means for heating the granular material, means for feeding unpuffed cereal particles into the partially enclosed end of the receptacle, a screw conveyor having solid flights and perforated flights mounted in the receptacle and movable therewith for mixing and advancing the heat transfer material and particles toward the discharge end, a separating screen mounted in tapering fashion adjacent the discharge end for separating the granular material from the particles, means mounted on walls of the receptacle beneath the screen for collecting and lifting the granular material, and means mounted in the central portion of the receptacle for receiving the lifted granular material and conveying it back towards the partially enclosed end.

2. The apparatus of claim 1 wherein the solid flights of the screw conveyor are located adjacent the partially enclosed end and form with the partially enclosed end of the cylinder a deposition zone.

3. The apparatus of claim 2 further comprising a vibrator attached to the means mounted in the central portion of the chamber for aiding in the conveyance of the granular material.

4. The apparatus of claim 3 further comprising a temperature indicating device mounted in the means for receiving the lifted granular material and so as to measure the temperature of the granular material being conveyed therein.

5. The apparatus of claim 4 further comprising baffles mounted in the puffing chamber for aiding in the intimate mixing of the cereal particles and granular material.

* * * * *